United States Patent
Cariou et al.

(10) Patent No.: US 10,356,624 B2
(45) Date of Patent: Jul. 16, 2019

(54) [11AX] CONDITIONS FOR SPATIAL REUSE USING JOINT TPC AND CCA

(71) Applicant: INTEL IP CORPORATION, Santa Clara, CA (US)

(72) Inventors: Laurent Cariou, Portland, OR (US); Chittabrata Ghosh, Fremont, CA (US); Po-Kai Huang, Santa Clara, CA (US); Robert Stacey, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 78 days.

(21) Appl. No.: 14/976,351

(22) Filed: Dec. 21, 2015

(65) Prior Publication Data

US 2017/0078891 A1    Mar. 16, 2017

Related U.S. Application Data

(60) Provisional application No. 62/216,613, filed on Sep. 10, 2015.

(51) Int. Cl.
*H04W 16/14* (2009.01)
*H04W 52/34* (2009.01)
*H04W 74/08* (2009.01)

(52) U.S. Cl.
CPC ......... *H04W 16/14* (2013.01); *H04W 52/343* (2013.01); *H04W 74/0808* (2013.01)

(58) Field of Classification Search
CPC ....... H04W 52/16; H04W 52/243–247; H04W 52/283; H04W 52/34; H04W 52/343; H04W 52/42; H04W 74/0808
See application file for complete search history.

(56) References Cited

U.S. PATENT DOCUMENTS

| | | | | |
|---|---|---|---|---|
| 2015/0358904 | A1* | 12/2015 | Kwon | H04W 52/0206 370/252 |
| 2016/0119047 | A1* | 4/2016 | Lee | H04B 7/0617 370/329 |
| 2017/0070962 | A1* | 3/2017 | Wang | H04W 52/241 |

* cited by examiner

*Primary Examiner* — Pao Sinkantarakorn
(74) *Attorney, Agent, or Firm* — Jason H. Vick; Sheridan Ross, PC

(57) ABSTRACT

An exemplary aspect is directed toward methods, apparatus, and systems related to spatial reuse with overlapping basic service set. A device may determine an overlapping basic service set (OBSS) associated with one or more access points. The device may then reduce a transmit power by a first margin. The device may then increase a packet detection threshold associated with the OBSS by a second margin. The device then sends an uplink data frame to at least one of the one or more access points.

20 Claims, 9 Drawing Sheets

| L-STF | L-LTF | L-SIG | RL-SIG | HE-SIG-A | HE-STF | HE-LTF |
|-------|-------|-------|--------|----------|--------|--------|
| L-STF | L-LTF | L-SIG | RL-SIG | HE-SIG-A | | |
| L-STF | L-LTF | L-SIG | RL-SIG | HE-SIG-A | | |
| L-STF | L-LTF | L-SIG | RL-SIG | HE-SIG-A | | |

[11AX] CONDITIONS FOR SPATIAL REUSE USING JOINT TPC AND CCA

RELATED APPLICATION DATA

This application claims the benefit of and priority under 35 U.S.C. § 119(e) to U.S. Patent Application No. 62/216,613, filed Sep. 10, 2015, entitled "SPATIAL REUSE WITH OVERLAPPING BASIS SERVICE SET," which is incorporated herein by reference in its entirety.

TECHNICAL FIELD

An exemplary embodiment is directed toward wireless networks. Some embodiments relate to wireless networks that operate in accordance with one of the Institute of Electrical and Electronics Engineers (IEEE) 802.11 standards including the IEEE 802.11-WLAN standards. Some embodiments relate to a wireless network communicating using Wireless Local Area Networks (WLAN). Some embodiments relate to high-efficiency wireless local-area networks (HEWs). Some embodiments relate to IEEE 802.11ax (and/or IEEE 802.11ac or IEEE 802.11ax+). Some embodiments relate to methods and devices for spatial reuse. Some embodiments relate to spatial reuse with overlapping basic service set in wireless communications.

BACKGROUND

Efficient use of the resources in a wireless local-area network (WLAN) is important to provide bandwidth and acceptable response times to the users of the WLAN. Wireless devices are becoming widely prevalent and are increasingly requesting access to wireless channels. The next generation WLAN, IEEE 802.11ax or High-Efficiency WLAN (HEW), is under development. HEW utilizes Orthogonal Frequency-Division Multiple Access (OFDMA) in channel allocation. The growing density of wireless networks and limited spectrum availability affects the performance of wireless networks. Consequently, improving the number of successful concurrent transmissions, also referred to as spatial reuse, in a given network area is important. One way to increase the efficiency of a WLAN is spatial re-use where wireless devices may spatially reuse frequencies of the wireless medium. However, often spatial reuse is difficult to achieve. Moreover, wireless devices need to operate with both newer protocols and with legacy devices.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
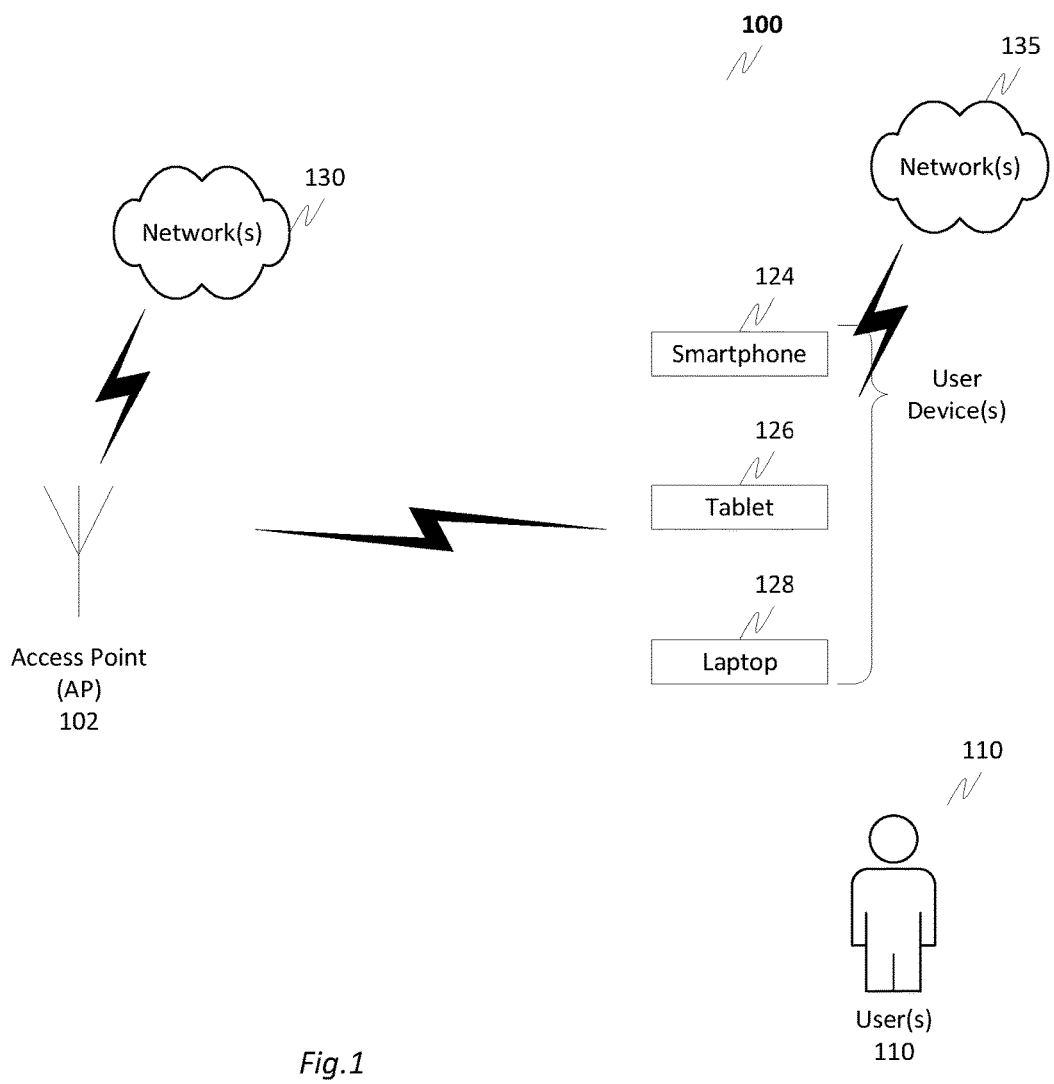
FIG. 1 shows a network diagram illustrating an exemplary network environment of an illustrative spatial reuse with overlapping basic service set system.

Embodiments may be implemented as part of one or more of: IEEE 802.11, IEEE 802.11 WLAN and/or IEEE 802.11ax (HE or HEW) However, the embodiments are not limited to IEEE 802.11 standards or Hotspot 2.0 standards. Embodiments can be used in implementation with other wireless communications standards, protocols, and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Presented herein are embodiments of systems, processes, methods, etc. The embodiments may relate to a communication device and/or communication system. The communication system can include a Wireless Local Area Network (WLAN) connection. A WLAN connection can include communication and association between two or more stations or wireless devices transmitting wide bandwidth PPDUs. The overall design and functionality of the system described herein is, as one example, a means for enhancing spatial reuse.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

One of the goal of IEEE 802.11ax is to enable better spatial reuse between neighboring BSSs in dense environments.

Spatial reuse between neighboring basic service sets (BSSs) may be employed in HEW systems in wireless communications environments, such as dense environments. One proposed solution is that Clear Channel Assessment (CCA) levels may be raised and the transmit power of a station (STA) may be reduced by the same proportion. As there are no changes regarding the protection of the existing link, this reuse model should be allowed without any conditions on all received frames. However, there is a risk of having more STAs that could access the channel close to the limit, and create an aggregated interference greater than with the legacy behavior.

This mechanism is very simple and it is scalable to even the densest environments. Another advantage is that the STA that implement the mechanism will directly benefit (incentive). Also, the technique is easy to certify in WFA. Another advantage is that the technique is fair to legacy device(s) and the technique should have priority over reuse solutions with "interference level."

There is however a risk of having more STAs that would access the channel close to the limit and creating an aggregated interference greater than with the legacy behavior. The probability of this happening is however reduced significantly by the fact that C and C' must be hidden nodes, and that they must be in a situation where they can reach their destination with a reduced TxPower. A simple protection could however be defined to be very cautious.

One exemplary embodiment is directed toward such protection. Specifically, to secure more protection, there can be multiple options: reduce more the TxPower in case of reuse, and/or reduce the number of STAs that can reuse by adding another condition, such as a "coin flip."

Thus, exemplary embodiments of the present disclosure relate to systems, methods, and devices for spatial reuse with overlapping basic service set system that may reduce more the Transmit Power (TxPower) in case of spatial reuse and/or may reduce the number of STAs that can perform spatial reuse by adding another condition.

In accordance with an exemplary embodiment, an STA may regard an Overlapping Basic Service Set (OBSS) PPDU with a valid physical layer (PHY) header and that has a receive power/RSSI M dB above the minimum receive sensitivity level as not having been received at all (e.g., should not update its NAV) at the condition that the TxPower used by the STA to transmit its PPDU is lower or equal to MaxDevice TxPower−(M+Margin) dBm if it starts transmitting before the end of the duration indicated in the OBSS PPDU. A PPDU is a physical layer convergence protocol (PLCP) data unit. It is also understood that the PPDU is a frame defined by the IEEE 802.11 standards. A received signal strength indicator (RSSI) is a measurement of the power present in a received radio signal.

In one exemplary embodiment, a proportional rule between TxPower and OBSS PD levels is created. Additionally, the definition of a MaxDeviceTxPower or AverageDeviceTxPower to use is defined. Moreover, the condition in time to apply the spatial reuse mechanism is identified. One exemplary advantage of these techniques is that it provides more protection to legacy STAs, and to any STAs from the ongoing link which may otherwise suffer from spatial reuse from other STAs.

FIG. 1 is an exemplary communications network illustrating an example network environment, according to some exemplary embodiments. Wireless network 100 may include one or more user devices 124-128 and one or more access point(s) (AP) 102, which may communicate in accordance with IEEE 802.11 communication standards, including IEEE 802.11ax. The device(s) 124-128 may be mobile devices that are non-stationary and do not have fixed locations.

Figure 6:
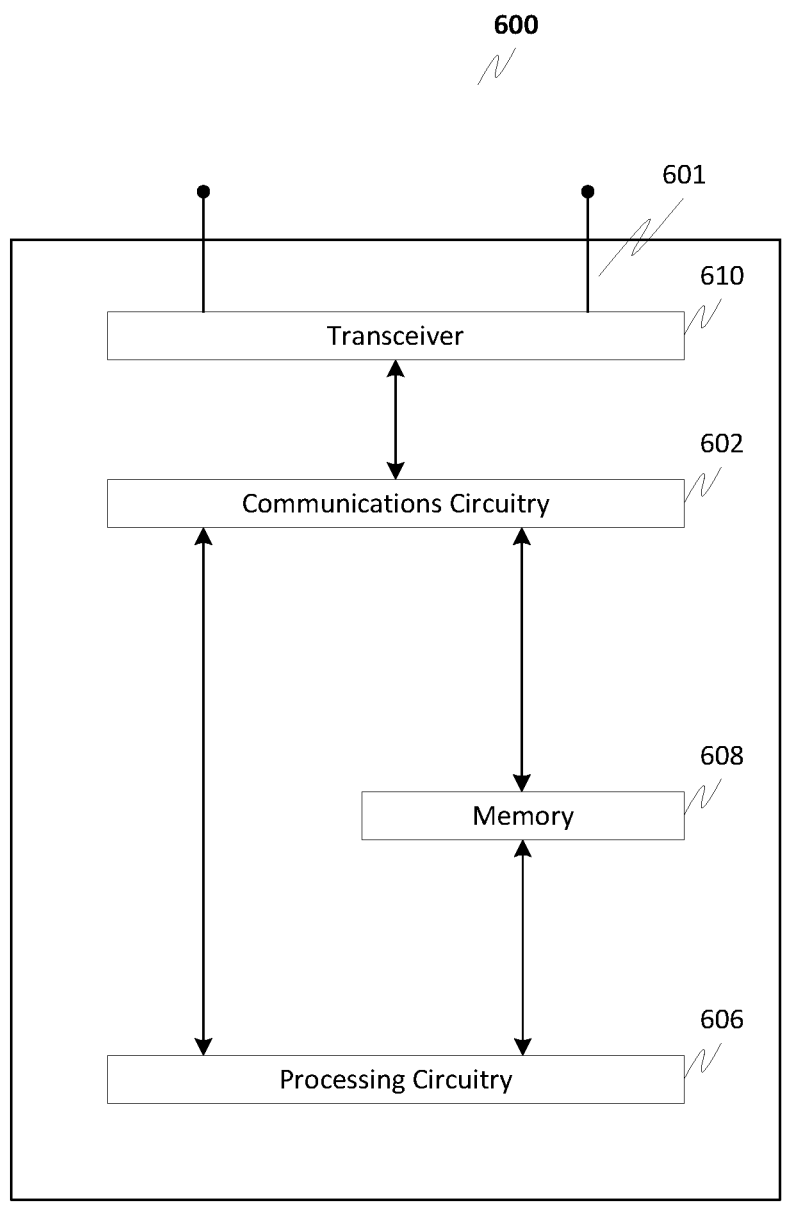
FIG. 6 illustrates a functional block diagram of an example communication station that may be suitable for use as a user device.
Figure 7:
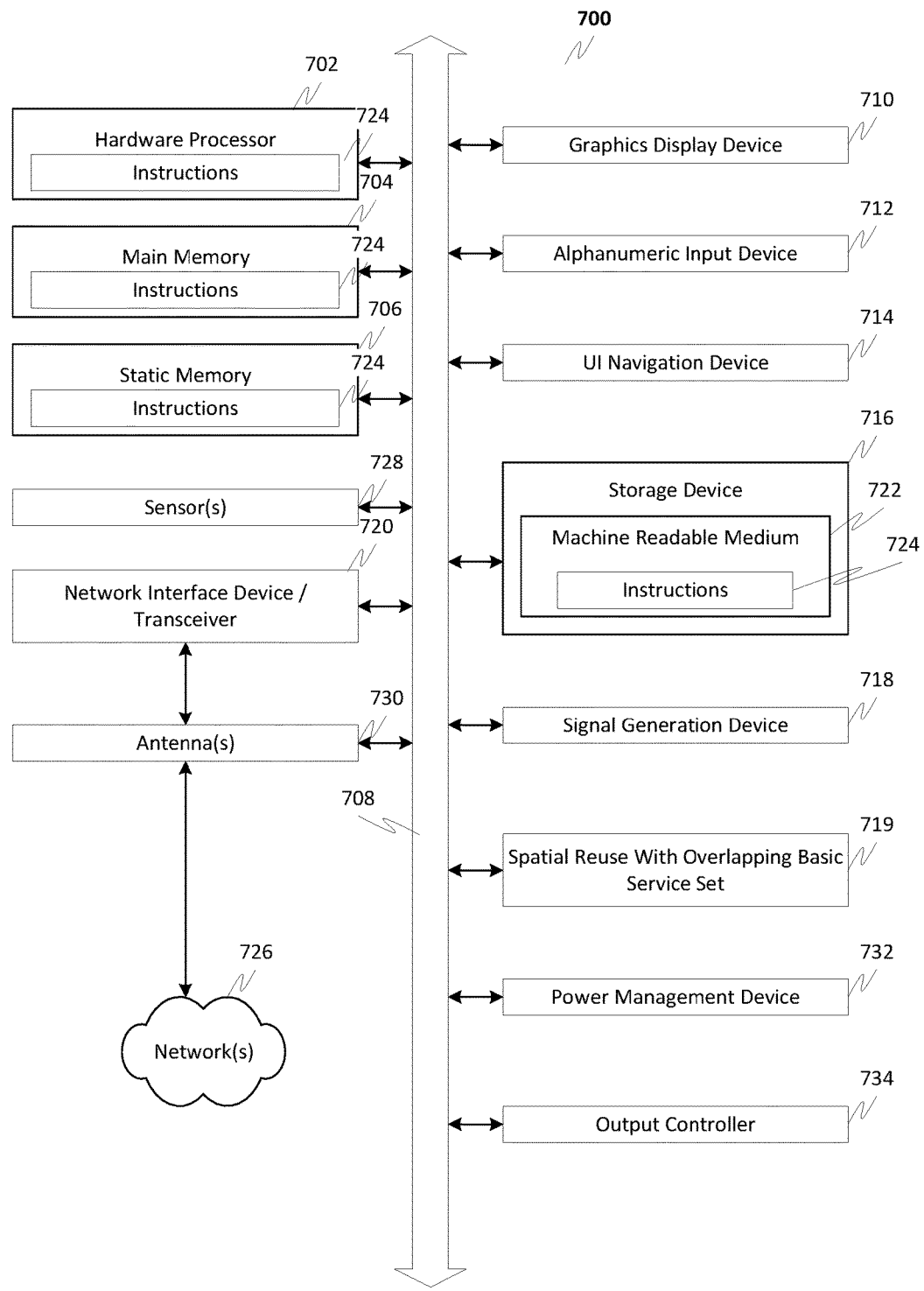
FIG. 7 is a block diagram of an example machine upon which any of one or more techniques disclosed herein may be performed.

In some embodiments, the user devices 124-128 and AP 102 may include one or more computer systems similar to that of the functional diagram of FIG. 6 and/or the example machine/system of FIG. 7.

One or more illustrative user device(s) 124-128 may be operable by one or more user(s) 110. The user device(s) (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.), an Internet of Things (IoT) device, and so forth.

Any of the user device(s) (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) (e.g., user devices 124, 126, 128), and AP 102 may include one or more communications antennae. Communications antenna may be any suitable type of antenna corresponding to the communications protocols used by the user device(s) and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The exemplary WLAN of FIG. 1 may comprise a Basis Service Set (BSS) that may include an AP (Access Point), and, for example, a plurality of high-efficiency wireless (HEW) (e.g., IEEE 802.11ax) STAs or devices 124-128. The network 100 may also include a plurality of legacy (e.g., IEEE 802.11n/ac, etc.) devices/stations (not shown).

The AP may be using IEEE 802.11 to transmit and receive information. The AP may also be a base station. The AP may use other communications protocols as well as the IEEE 802.11 protocol. The IEEE 802.11 protocol may be IEEE 802.11ax. The IEEE 802.11 protocol may include the use of Orthogonal Frequency Division Multiple-Access (OFDMA), Time Division Multiple Access (TDMA), and/or Code Division Multiple Access (CDMA). The IEEE 802.11 protocol may include a multiple access technique, for example, the IEEE 802.11 protocol may include Space-Division Multiple Access (SDMA) and/or Multiple-User Multiple-Input Multiple-Output (MU-MIMO).

The legacy devices/stations may operate in accordance with one or more of IEEE 802.11 a/b/g/n/ac/ad/af/ah/aj, or another legacy wireless communication standard. The legacy devices may be STAs or IEEE STAs. The HEW STAs may be wireless transmit and receive devices such as cellular telephone, smart telephone, handheld wireless device, wireless glasses, wireless watch, wireless personal device, tablet, an Internet of Things (IoT) device, laptop, tablet, or another device that may be transmitting and receiving using the IEEE 802.11 protocol such as IEEE 802.11ax or another wireless protocol. In some embodiments, the HEW STAs may be termed High Efficiency (HE) stations.

The AP may communicate with legacy devices in accordance with legacy IEEE 802.11 communication techniques. In some exemplary embodiments, the AP may also be configured to communicate with HEW STAs in accordance with legacy IEEE 802.11 communication techniques.

In some embodiments, a HEW frame may be configurable to have the same bandwidth as a subchannel. The bandwidth of a subchannel may be, as non-limiting examples, 20 MHz, 40 MHz, 80 MHz, 160 MHz, or 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less than or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the AP, HEW STA, and/or legacy device(s) may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, the AP may operate as a master station which may be arranged to contend for a wireless medium (e.g., during a contention period) to receive exclusive control of the medium for an HEW control period. In some embodiments, the HEW control period may be termed a transmission opportunity (TXOP). The AP may transmit a HEW master-sync transmission, which may be a trigger frame or HEW control and schedule transmission, at the beginning of the HEW control period. The AP may transmit a time duration of the TXOP and sub-channel information. During the HEW control period, HEW STAs may communicate with the AP in accordance with a non-contention based multiple access technique such as OFDMA or MU-MIMO. This is unlike conventional WLAN communications in which devices communicate in accordance with a contention-based communication technique, rather than a multiple access technique. During the HEW control period, the AP may communicate with HEW stations using one or more HEW frames. During the HEW control period, the HEW STAs may operate on a sub-channel smaller than the operating range of the AP. During the HEW control period, legacy stations refrain from communicating.

In accordance with some embodiments, during the master-sync transmission the HEW STAs may contend for the wireless medium with the legacy devices being excluded from contending for the wireless medium during the master-sync transmission. In some embodiments a trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a Time-Division Multiple Access (TDMA) technique or a Frequency Division Multiple Access (FDMA) technique. In some embodiments, the multiple access technique may be a Space-Division Multiple Access (SDMA) technique.

The AP may also communicate with legacy stations and/or HEW stations in accordance with legacy IEEE 802.11 communication techniques. In some embodiments, the AP may also be configurable to communicate with HEW stations outside the HEW control period in accordance with legacy IEEE 802.11 communication techniques, although this is not a requirement.

Figure 2:
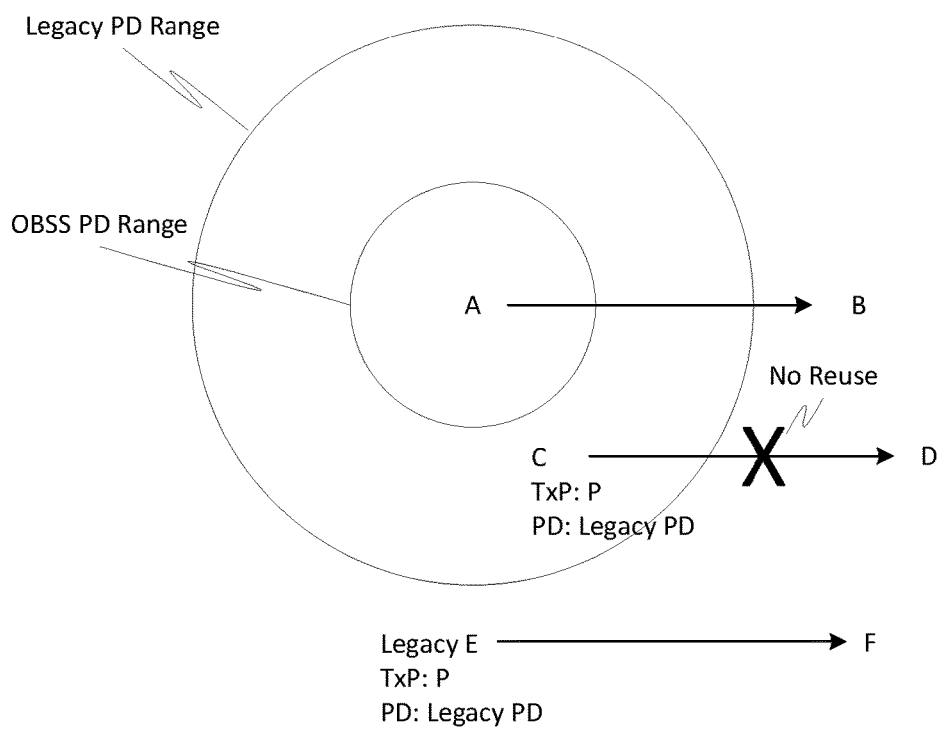
FIG. 2 illustrates a legacy clear channel assessment (CCA) operation.

FIG. 2 illustrates a legacy clear channel assessment (CCA) operation. In the example of FIG. 2, there are shown user devices A, B, C, D, E, and F, also referred to as STAs, with communication links there between. Assume that interference received in A from E may be M dB lower than from C. That is IAE=R, IAC=R+M, where R is the interference. Similarly, a signal from A received in E maybe M dB lower than a signal from A received in C. Under the current rules, and in the current configuration, when A transmits to B (the on-going link), C cannot transmit simultaneously, but E can transmit. This is because the signal from A is below PD in E, while the signal is above PD in C.

Figure 3:
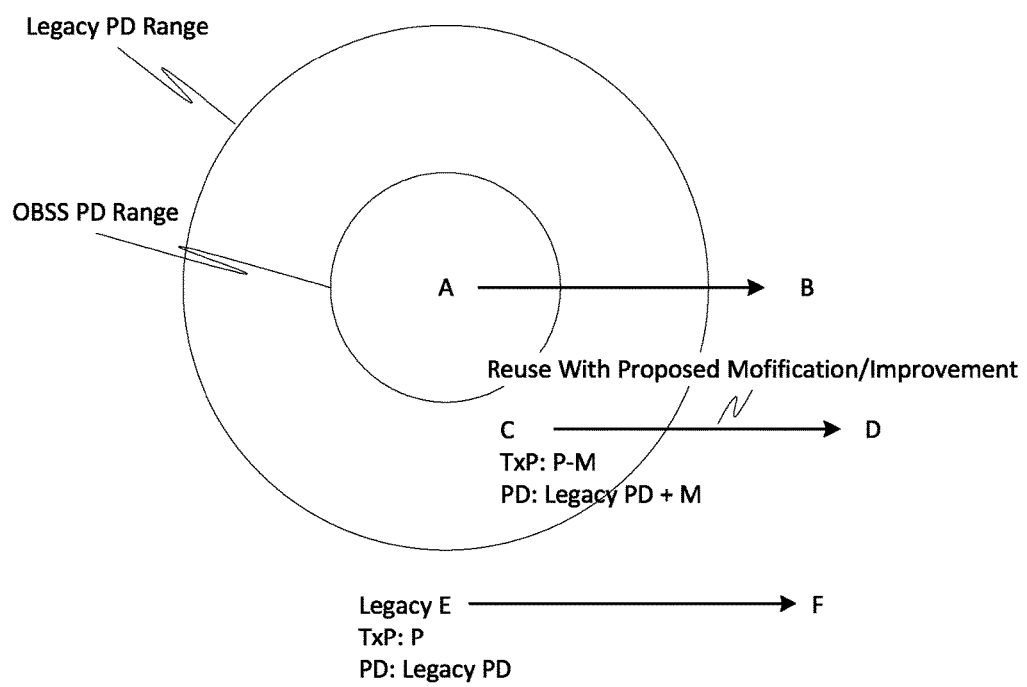
FIG. 3 illustrates an exemplary a spatial reuse mechanism.

FIG. 3 illustrates a spatial reuse mechanism, in accordance with one or more exemplary embodiments.

In one embodiment, user device C may be allowed to reduce the transmit power (TxPower) by M dB and may be allowed to raise its packet detection threshold when the packet is identified as being from another BSS (e.g., OBSS_PD (Preamble Detect) level) by M dB. The signal from A that is received in E may still be M dB lower than the signal from A received in C. However, the signal from user device A is below PD in E, and below OBSSPD in C. Therefore, E and C can transmit and hence, the interference received in A from C and E are now equal $I_{AE}=I_{AC}$.

In one embodiment, if a joint adaptation of OBSS_PD and TxPower is applied, that is using an equal proportion by raising the PD level by M dB and reducing the TxPower by M, the interference generated by the link which may be allowed to access the channel (C-D) on the existing link (A-B) may be equal to the one generated by a legacy link M dB which is farther (E-F) which may access the channel with current legacy rules. As there are no changes about the protection of the existing link, this reuse model may be allowed without any conditions on all received frames. It is understood that the above is only an example and that other examples may be used. One advantage is that the STA that implement the mechanism will directly benefit (incentive) and it is very simple and scalable to even the densest environments. Also, the technique is easy to certify in WFA. Another advantage is that the technique is fair to legacy device(s) and the technique should have priority over reuse solutions with "interference level."

Figure 4A:
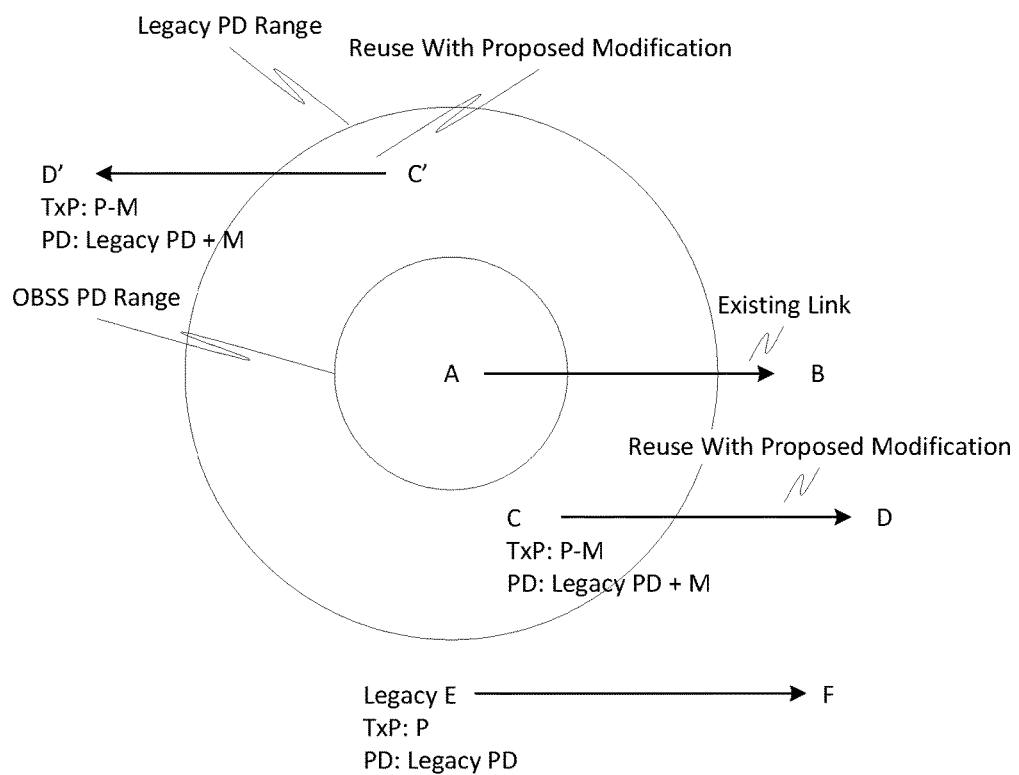
FIG. 4A illustrates an exemplary interference protection mechanism.

FIG. 4A illustrates an interference protection mechanism in accordance with one or more exemplary embodiments.

There may be a risk of having more STAs that would access the channel close to the limit (for example, creating interference around −82 dBm on A) and creating an aggregated interference greater than with the legacy behaviour. However, the probability of this happening may be reduced significantly by the fact that C and C' may be hidden nodes and that the nodes may be in a situation where they can reach their destination with a reduced TxPower.

In one embodiment, the TxPower, in case of reuse, may be reduced in order to obtain more or additional protection. For example, if a joint adaptation of OBSS_PD and TxPower is applied, using an unequal proportion, for example, by raising the PD level by M and reducing the TxPower by M+Margin, the interference generated by multiple links, which are now allowed to access the channel (C-D) on the existing link (A-B), may be equal to the interference generated by legacy links M dB farther away (E-F) which can access the channel with current legacy rules.

In one embodiment, the number of STAs that can reuse by adding another condition with a "coin flip" may be reduced. For example, the possibility to reuse the channel by a joint adaptation of OBSS_PD and TxPower, using an equal or unequal proportion, but only if a coin flip, runs once the OBSS packet is detected. The determination is equal to "allowed to transmit" (rand(0,1)=1, for instance, to reduce by 2 the number of users that can reuse. The margin may be 1) a fixed value, defined in the standard; 2) a fixed value defined by the AP; 3) A value proportional to M, as defined in the standard or by the AP, for instance, Margin=M/10 or M/5, etc.

In another embodiment, the power reduction by M+Margin may be applied to the Max Power defined by the regulator in the region where Max Power used. By doing this, 2 STAs with different operating power levels (e.g., 30 dBm and 10 dBm) may have different CCA levels when operating at their operating power. Basically, the STA operating at a lower power would have an OBSS CCA threshold 20 dB higher than the STA with 30 dBm TxPower. One definition may be to apply a power reduction by M+Margin to the operating power or the MaxOperatingPower, or the AverageOperatingPower of the device. This way, 2 STAs with different operating powers (e.g., 30 dBm and 10 dBm) may have the same OBSS CCA threshold. This may be logical if by operating at 10 dBm while they can transmit at 30 dBm, these STAs accept to be less protected (because they transmit with a lower power) and should not be favored with a more aggressive CCA level.

In one embodiment, and in order for the reuse mechanism to be defined, for each STA it is defined: either a MaxDeviceTxPower, or an AverageDeviceTxPower. These values may be measured and certified. These values may be advertised by the STAs in different frames (for instance association frames, etc.) as part of their capabilities.

Figures 4B, 4C:
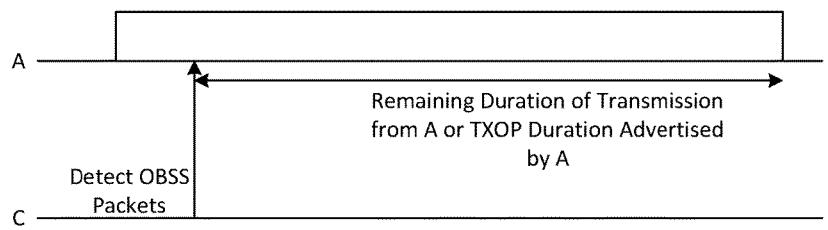
FIG. 4B illustrates a exemplary transmission before the end of an OBSS packet duration.
FIG. 4C depicts the use of robust preambles.

FIG. 4B depicts a transmission before the end of an OBSS packet duration, in accordance with one or more embodiments.

Here, a joint adaptation of transmit power control (TPC) and CCA to reuse the spectrum may be applied under certain conditions. For example, this may be applied when detecting an OBSS packet with a valid PHY header, which is detected as being from an OBSS. When receiving this packet, a STA that wants to perform spatial reuse may reduce its TxPower by M+Margin dB if it receives the OBSS packet M dB above the minimum sensitivity level. This may be true if the STA starts transmitting before the end of the OBSS packet duration as shown in FIG. 4B. In other words, the power control is only applied if the transmission from C happens in the remaining duration of the detected OBSS packets or the advertised TXOP duration from the detected OBSS packets as shown in FIG. 4B.

With this proposition, when receiving an OBSS packet, an STA may calculate the TxPower at which the STA can transmit if the STA starts before the end of the duration of the OBSS packet. The STA can then: 1) either decide to ignore the network allocation vector (NAV), reuse the channel and transmit when the STAs countdown reaches 0 with a reduced TxPower; or 2) decide to respect the NAV and wait until the end of the OBSS packet transmission to finalize its countdown and potentially transmit with a higher power. It is understood that NAV may be a virtual carrier-sensing mechanism used with wireless network protocols such as IEEE 802.11. The virtual carrier sensing may be a logical abstraction, which limits the need for physical carrier-sensing at the air interface in order to save power.

In one embodiment, a STA may regard an OBSS PPDU with a valid PHY header, that has a receive power/RSSI M dB above the minimum receive sensitivity level, as not having been received at all (e.g., should not update its NAV) on the condition that the TxPower used by the STA to transmit its PPDU is lower or equal to MaxDeviceTxPower−(M+Margin) dBm if it starts transmitting before the end of the duration indicated in the OBSS PPDU.

In another embodiment, a specific OBSS_PD level may be used by C, and any OBSS packets detected by C, with signal strength S<OBSS_PD, triggering the operation of power control, and C reducing power by (S-minimum_sensitivity_level). Hence, device C does not dynamically change the OBSS_PD level.

FIG. 4C depicts the use of robust preambles, in accordance with one or more embodiments.

In one embodiment, the AP and non-AP STAs may use robust preambles (for example, repeated legacy SIGNAL (RL-SIG) field in a PHY preamble, and/or a repeated high efficiency SIGNAL A (HE-SIG-A) field in PHY header) for frame exchanges. The repetition may be depicted in the frequency domain (each L-STF, L-LTF transmitted in 20

MHz). The repetition can also be obtained in time domain. The use of a robust preamble in frame exchanges may be recommended by the AP (or made as a condition) for operating with this spatial reuse mechanism and used for specific durations only. Initiation of such a duration can be advertised by the AP, either in a beacon or any other management or control frame.

The repetition of L-SIG or HE-SIG-A may provide additional receiver processing gain and link margin for better spatial reuse and protection of weaker ongoing OBSS transmissions. This repetition may allow additional protection and hence, result in reduced collisions at the cost of additional air time for RL-SIG or HE-SIG-A.

Figure 5:
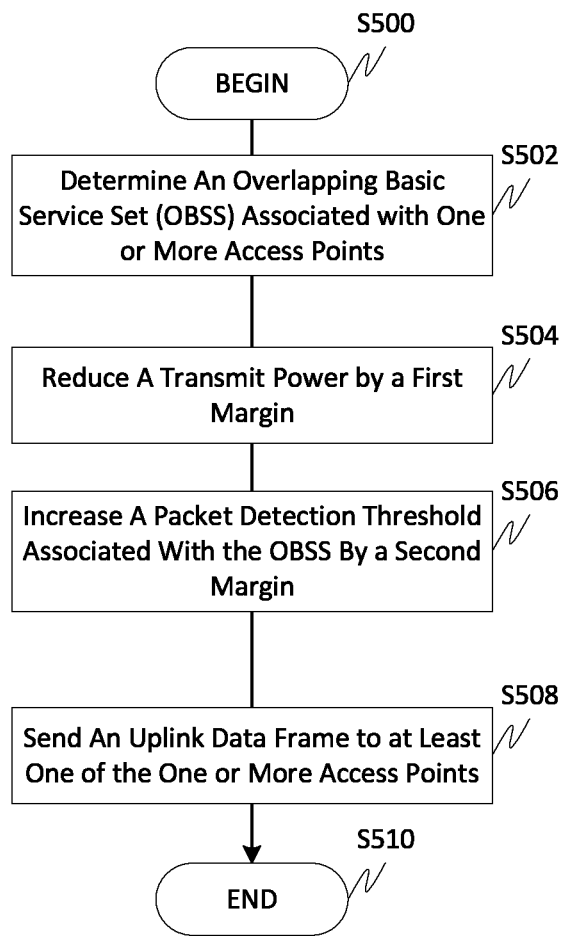
FIG. 5 illustrates a flowchart of an illustrative method for spatial reuse with overlapping basic service set system.

FIG. 5 illustrates a flowchart for spatial reuse with overlapping basic service set in a communications system.

Control begins at step S500 and continues to step S502. In step S502, a user device may determine an overlapping basic service set (OBSS) associated with one or more access points. Next, in step S504, the user device may reduce a transmit power by a first margin. Then, in step S506, the user device may increase a packet detection threshold associated with the OBSS by a second margin. Control then continues to step S508.

In step S508, the user device may cause an uplink data frame to be sent to at least one of the one or more access points. The user device may further determine a receive power margin above a minimum receive sensitivity level. The first margin is equal to the second margin. The first margin is the receive power margin and the second margin is the receive power margin plus a predetermined power threshold. The predetermined power threshold may be in accordance with a communication standard, defined by an access point, or a value proportional to the receive power margin. Control then continues to step S510 where the control sequence ends.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device (FIG. 1) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device may, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

FIG. 7 illustrates a block diagram of an example of a machine 700 or system upon which any one or more of the techniques (e.g., methodologies) discussed herein may be performed. In some embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a spatial reuse with overlapping basic service set device 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The spatial reuse with overlapping basic service set device 719 may be carry out or perform any of the operations and processes (e.g., process 500) described and shown above.

While the machine-readable medium 722 is illustrated as a single medium, the term "machine-readable medium" may include a single medium or multiple media (e.g., a centralized or distributed database, and/or associated caches and servers) configured to store the one or more instructions 724.

Certain embodiments may be implemented in one or a combination of hardware, firmware, and software. Other embodiments may also be implemented as instructions stored on a computer-readable storage device, which may be read and executed by at least one processor to perform the operations described herein. The instructions may be in any suitable form, such as but not limited to source code, compiled code, interpreted code, executable code, static code, dynamic code, and the like. A computer-readable storage device or medium may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device memory.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
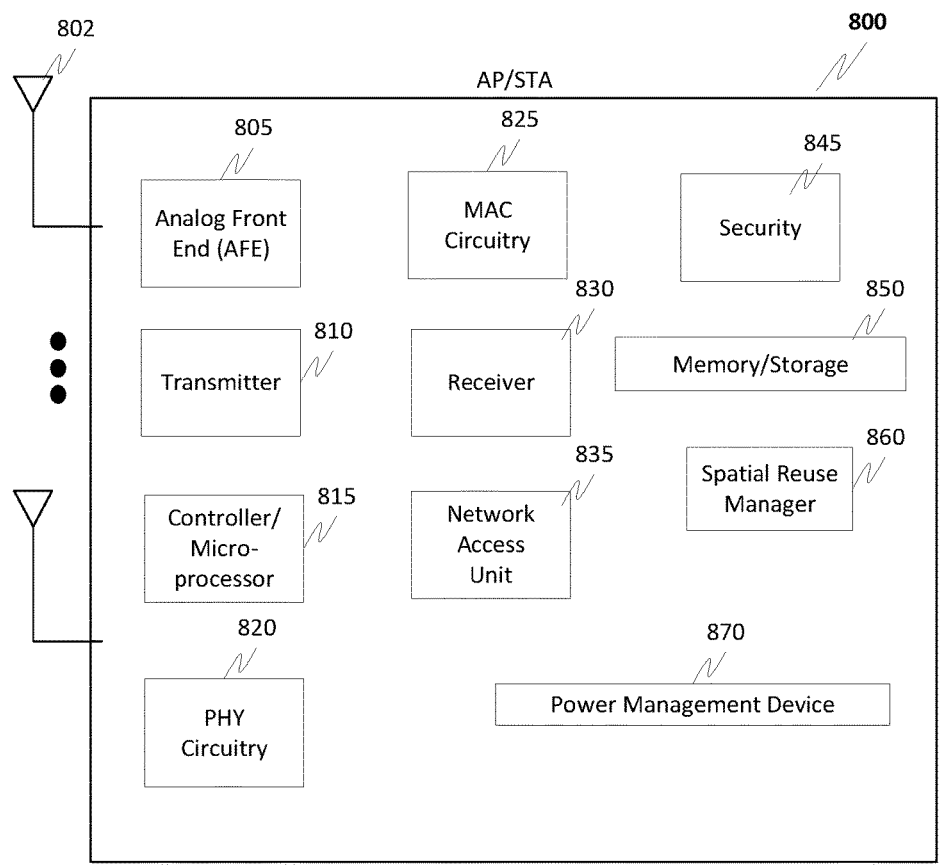
FIG. 8 is a more detailed function block diagram of an exemplary communications device.

FIG. 8 illustrates a more detailed function block diagram of a communications device 800, such as an exemplary STA, AP, HEW device, user device, or the like, in accordance with some embodiments. The device 800 may be an HEW compliant device that may be arranged to communicate with one or more other HEW devices, such as HEW STAs 124-128 (FIG. 1) or a access point(s) 102 (FIG. 1) as well as communicate with legacy device(s).

HEW STAs and legacy devices may also be referred to as HEW devices and legacy STAs, respectively. The device 800 may be suitable for operating as AP 102 (FIG. 1) or a HEW STA/device.

The device 800 can have one more antennas 802, for use in wireless communications such as WLAN, multi-input multi-output (MIMO) communications, Bluetooth®, etc. The antennas 802 can include, but are not limited to directional antennas, omnidirectional antennas, monopoles, patch antennas, loop antennas, microstrip antennas, dipoles, and any other suitable antenna(s) for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users. The antennas at the STAs could also be a special type of antenna, e.g., a co-located dual-polarized antenna, which provides good isolation between transmission and reception to help mitigate self-interference at the receiving chain. In some multiple-input multiple-output (MIMO) embodiments, the antennas may be effectively separated to take advantage of spatial diversity and the different channel characteristics that may result.

Antennas 802 generally interact with an Analog Front End (AFE) module 805, which is needed to enable the correct processing of the received modulated signal and signal conditioning for a transmitted signal. The AFE 805 can be functionally located between the antenna and a digital baseband system in order to convert the analog signal into a digital signal for processing and vice-versa.

In accordance with some exemplary embodiments, the device 800 may include, among other things, physical (PHY) circuitry 820, and media access control (MAC) circuitry 825. PHY circuitry 820 and MAC circuitry 825 may be HEW compliant layers and may also be compliant with one or more legacy IEEE 802.11 standards. MAC circuitry 825 may be arranged to configure packets such as a physical layer convergence procedure (PLCP) protocol data unit (PPDUs) and arranged to transmit and receive PPDUs, among other things. The device 800 may also include a controller 815 and memory 850 configured to perform the various operations described herein. The controller 815 may be electrically coupled to the transceiver (transmitter 810/receiver 830), which may be coupled to the antenna(s) 802. While FIG. 8 depicts the processor and the transceiver as separate components, the processor and transceiver may be integrated together in an electronic package or chip.

In some embodiments, the MAC circuitry 825 may be arranged to contend for a wireless medium during a contention period to receive control of the medium for the HEW control period and configure an HEW PPDU. In some embodiments, the MAC circuitry 825 may be arranged to contend for the wireless medium based on channel contention settings, a transmitting power level, and/or a CCA level.

The PHY circuitry 820 may be arranged to transmit the HEW PPDU. The PHY circuitry 820 may include circuitry for modulation/demodulation, upconversion/downconversion, filtering, amplification, etc. In some embodiments, the circuitry 820 may include one or more processors. The circuitry 820 may be configured to perform functions based on instructions being stored in a RAM or ROM, or based on special purpose circuitry. The circuitry 820 may include processing circuitry and/or transceiver circuitry in accordance with some embodiments. The circuitry 820 may include a processor such as a general purpose processor or special purpose processor. The circuitry 820 may implement one or more functions associated with transmit/receive componentry discussed herein, the MAC circuitry 825, the AFE 805 and/or the memory 850.

In some embodiments, the device 800 may be configured to perform one or more of the functions and/or methods described herein and/or in conjunction with figures appended hereto.

In some embodiments, the transmitter 810 and receiver 830 can use two or more antennas 802 that may be coupled to the PHY circuitry 820 and arranged for sending and receiving signals including transmission of the HEW packets. The transceiver components may transmit and receive data such as HEW PPDU and packets that include an indication that the device 800 should adapt the channel contention settings according to settings included in the packet. The memory 850 may store information for configuring the other circuitry to perform operations for configuring and transmitting HEW packets and performing the various operations to perform one or more of the functions and/or methods described herein.

In some embodiments, the device 800 may be configured to communicate using OFDM communication signals over a multicarrier communication channel. In some embodiments, the device 800 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described herein, although the scope of the invention is not limited in this respect, as they may also be suitable to transmit and/or receive communications in accordance with other techniques and standards. In some embodiments, the device 800 may use the 4× symbol duration of 802.11n or 802.11ac.

In some embodiments, the device 800 may be part of a portable wireless communication device, such as a personal digital assistant (PDA), a laptop or portable computer with wireless communication capability, a tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The device 800, as discussed above, can also include a controller/microprocessor 815 and a memory/storage 850. The device 800 can interact with the memory/storage 850 which may store information and operations necessary for configuring and transmitting or receiving the messages/information described herein. The memory/storage 850 may also be used in connection with the execution of application programming or instructions by the controller/microprocessor 815, and for temporary or long term storage of program instructions and/or data. As examples, the memory/storage 850 may comprise a computer-readable device, RAM, ROM, DRAM, SDRAM or other storage devices and media.

The controller/microprocessor 815 may comprise a general purpose programmable processor or controller for executing application programming or instructions related to the device 800. Further, controller/microprocessor 815 can perform operations for determining, configuring and transmitting messages/information as described herein. The controller/microprocessor 815 may include multiple processor cores, and/or implement multiple virtual processors. Optionally, the controller/microprocessor 815 may include multiple physical processors. By way of example, the controller/microprocessor 815 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The device 800 includes, as discussed, a transmitter 810 and receiver 830 which can transmit and receive signals, respectively, to and from other STAs or access points using the one or more antennas 802, AFE 805 and other elements as described above. Included in the device 800 circuitry is the medium access control or MAC/NAV (Media Access Control/Network Allocation Vector) circuitry 825. MAC/NAV circuitry 825 provides the medium for controlling access to the wireless medium. In an exemplary embodiment, the MAC/NAV circuitry 825 may be arranged to contend for a wireless medium and configure frames, packets, messages and/or information for communicating over the wireless medium.

The device 800 can also optionally contain a security module 845. This security module 845 can contain information regarding, but not limited to, security parameters required to connect the device 800 to an AP or other available networks or network devices, and can include WEP or WPA/WPA-2 (optionally+AES and/or TKIP) security access keys, network keys, etc. A WEP security access key is a security password used by Wi-Fi networks. Knowledge of this code will enable the device 800 to exchange information with an access point. The information exchange can occur through encoded messages with the WEP access code often being chosen by the network administrator. WPA is an added security standard that is also used in conjunction with network connectivity with stronger encryption than WEP.

Another module that the device 800 can include is the network access unit 835. The network access unit 835 can be used for connecting with, for example, an AP or master station. In one exemplary embodiment, connectivity can include synchronization between devices. In another exemplary embodiment, the network access unit 835 can work as a medium which provides support for communication with other stations. In yet another embodiment, the network access unit 835 can work in conjunction with at least the MAC/NAV circuitry 825 and/or PHY circuitry 820. The network access unit 835 can also work and interact with one or more of the modules/components described herein.

The device 800 also includes a spatial reuse manager 860 and a power management device 870. In operation, an STA, using one or more of the spatial reuse manager 860, controller 815 and memory 850, may regard an Overlapping Basic Service Set (OBSS) PPDU with a valid physical layer (PHY) header and that has a receive power/RSSI M dB above the minimum receive sensitivity level as not having been received at all (e.g., the device 800 should not update the NAV) upon the condition that the TxPower used by the device 800 (and managed by the power management device 870) to transmit its PPDU is lower or equal to MaxDevice TxPower−(M+Margin) dBm if the device 800 starts transmitting before the end of the duration indicated in the OBSS PPDU.

Moreover, the spatial reuse manager 860 and power management 870, optionally cooperating with one or more of the elements shown in FIG. 8, can use one of the above discussed options to achieve greater protection. For example, and optionally, the power reduction by M+Margin can be applied to the Max Power defined by the regulator in the region where is it used as discussed above. Optionally still, a joint adaptation of TPC and CCA to reuse the spectrum can be applied when certain conditions are met. Optionally still, the AP and non-AP STAs can use robust preambles in the PHY preamble, or a repeated HE-SIG-A field in the PHY header for frame exchanges.

Although the device(s) 800 is illustrated as having several separate functional elements, one or more of the functional elements may be combined and may be implemented by combinations of software- and/or hardware-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

While the techniques discussed herein have been specifically discussed in relation to IEEE 802.11 systems, it should be appreciated that the techniques discussed herein can generally be applicable to any type of wireless communication standard, protocol, and/or equipment. Moreover, all the flowcharts have been discussed in relation to a set of exemplary steps, it should be appreciated that some of these steps could be optional and excluded from the operational flow without affecting the success of the technique. Additionally, steps provided in the various flowcharts illustrated herein can be used with other techniques illustrated herein.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein.

Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

It should also be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to 802.11 communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the description omits well-known structures and devices that may be shown in block diagram form or otherwise summarized.

Exemplary aspects are directed toward:
A wireless system, comprising:
  at least one memory that stores computer-executable instructions; and
  at least one processor configured to access the at least one memory, wherein the at least one processor is configured to execute the computer-executable instructions to:

determine an overlapping basic service set (OBSS) associated with one or more access points;
reduce a transmit power of a transceiver by a first margin;
increase a packet detection threshold associated with the OBSS by a second margin; and
send an uplink data frame to at least one of the one or more access points.

Any of the above aspects, wherein the at least one processor is further configured determine a receive power margin above a minimum receive sensitivity level.

Any of the above aspects, wherein the first margin is equal to the second margin.

Any of the above aspects, wherein the first margin is the receive power margin and the second margin is the receive power margin plus a predetermined power threshold.

Any of the above aspects, wherein the predetermined power threshold is based on one or more of a communication standard, defined by an access point, and a value proportional to the receive power margin.

Any of the above aspects, further comprising:
a transceiver configured to transmit and receive wireless signals;
an antenna coupled to the transceiver Any of the above aspects, further comprising one or more of an analog front end, a security module, storage, one or more antennas, MAC circuitry, and a network access unit.

Any of the above aspects, wherein a power reduction by M+Margin is applied to a Max Power defined by a regulator in a region, wherein M is in dB.

Any of the above aspects, wherein a joint adaptation of TPC (Transmit Power Control) and CCA (Clear Channel Assessment) are used to reuse a spectrum when certain conditions are met.

Any of the above aspects, wherein an access point and a station use robust preambles in the PHY preamble, or a repeated HE-SIG-A field in the PHY header, for frame exchanges.

A method of operating a wireless communications network comprising: determining an overlapping basic service set (OBSS) associated with one or more access points;
reducing a transmit power of a transceiver by a first margin;
increasing a packet detection threshold associated with the OBSS by a second margin; and
sending an uplink data frame to at least one of the one or more access points.

Any of the above aspects, further comprising determining a receive power margin above a minimum receive sensitivity level.

Any of the above aspects, wherein the first margin is equal to the second margin.

Any of the above aspects, wherein the first margin is the receive power margin and the second margin is the receive power margin plus a predetermined power threshold.

Any of the above aspects, wherein the predetermined power threshold is based on one or more of a communication standard, defined by an access point, and a value proportional to the receive power margin.

Any of the above aspects, wherein a transceiver in the wireless communications network further comprises one or more of an analog front end, a security module, storage, one or more antennas, MAC circuitry, and a network access unit.

Any of the above aspects, further comprising applying a power reduction by M+Margin to a Max Power defined by a regulator in a region, wherein M is in dB.

Any of the above aspects, further comprising using a joint adaptation of TPC (Transmit Power Control) and CCA (Clear Channel Assessment) to reuse a spectrum.

Any of the above aspects, further comprising using robust preambles in the PHY preamble, or a repeated HE-SIG-A field in the PHY header, for frame exchanges.

Any of the above aspects, wherein the transceiver further comprises one or more of an analog front end, a security module, storage, one or more antennas, MAC circuitry, and a network access unit.

A non-transitory computer-readable information storage media, having stored thereon instructions, that when executed by a processor, perform a method for operating a wireless communications network, comprising:
determining an overlapping basic service set (OBSS) associated with one or more access points;
reducing a transmit power of a transceiver by a first margin;
increasing a packet detection threshold associated with the OBSS by a second margin; and
sending an uplink data frame to at least one of the one or more access points.

Any of the above aspects, further comprising determining a receive power margin above a minimum receive sensitivity level.

Any of the above aspects, wherein the first margin is equal to the second margin.

Any of the above aspects, wherein the first margin is the receive power margin and the second margin is the receive power margin plus a predetermined power threshold.

Any of the above aspects, wherein the predetermined power threshold is based on one or more of a communication standard, defined by an access point, and a value proportional to the receive power margin.

Any of the above aspects, wherein the transceiver further comprises one or more of an analog front end, a security module, storage, one or more antennas, MAC circuitry, and a network access unit.

Any of the above aspects, further comprising applying a power reduction by M+Margin to a Max Power defined by a regulator in a region, wherein M is in dB.

Any of the above aspects, further comprising using a joint adaptation of TPC (Transmit Power Control) and CCA (Clear Channel Assessment) to reuse a spectrum.

Any of the above aspects, further comprising using robust preambles in the PHY preamble, or a repeated HE-SIG-A field in the PHY header, for frame exchanges.

A wireless system, comprising:
means for determining an overlapping basic service set (OBSS) associated with one or more access points;
means for reducing a transmit power of a transceiver by a first margin;
means for increasing a packet detection threshold associated with the OBSS by a second margin; and
means for sending an uplink data frame to at least one of the one or more access points.

Any of the above aspects, further comprising means for determining a receive power margin above a minimum receive sensitivity level.

Any of the above aspects, wherein the first margin is equal to the second margin.

Any of the above aspects, wherein the first margin is the receive power margin and the second margin is the receive power margin plus a predetermined power threshold.

Any of the above aspects, wherein the predetermined power threshold is based on one or more of a communication standard, defined by an access point, and a value proportional to the receive power margin.

Any of the above aspects, wherein a transceiver in the wireless communications network further comprises one or more of an analog front end, a security module, storage, one or more antennas, MAC circuitry, and a network access unit.

Any of the above aspects, further comprising means for applying a power reduction by M+Margin to a Max Power defined by a regulator in a region, wherein M is in dB.

Any of the above aspects, further comprising means for using a joint adaptation of TPC (Transmit Power Control) and CCA (Clear Channel Assessment) to reuse a spectrum.

Any of the above aspects, further comprising means for using robust preambles in the PHY preamble, or a repeated HE-SIG-A field in the PHY header, for frame exchanges.

Any of the above aspects, wherein the means further comprises one or more of an analog front end, a security module, storage, one or more antennas, MAC circuitry, and a network access unit.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, LiFi, DENSIFi Sig, and the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Provided herein are exemplary systems and methods for spatial reuse in a communications environment. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless system, comprising:
   at least one memory that stores computer-executable instructions; and
   at least one processor configured to access the at least one memory, wherein the at least one processor is configured to execute the computer-executable instructions to:
   determine an overlapping basic service set (OBSS) associated with one or more access points;
   reduce a transmit power of a transceiver by a first margin at least based on the determined OBSS;
   increase, in conjunction with the reduction of the transmit power, a packet detection threshold associated with the OBSS by at least a second margin for spatial reuse of a wireless medium; and
   reduce transmit power for an uplink data frame to be sent to at least one of the one or more access points, wherein the transmit power for the uplink data frame is adjusted by a power management device for at least one of the one or more access points to avoid interference with reception of an ongoing OBSS data unit to the transceiver.

2. The system of claim 1, wherein the at least one processor is further configured with a minimum receive sensitivity level.

3. The system of claim 1, wherein the instructions increase a packet detection threshold when the packet is identified as being from another basic service set (BSS).

4. The system of claim 2, wherein the second margin is a receive power margin plus a predetermined power threshold.

5. The system of claim 1, wherein spatial reuse criteria are defined in one or more frames.

6. The system of claim 1, wherein the system is configured to transmit the uplink data frame via one or more antennas coupled to a transceiver.

7. The system of claim 1, further comprising MAC circuitry that receives the ongoing OBSS data unit.

8. The system of claim 1, wherein a power reduction by a value plus a margin is applied to a maximum operating power.

9. The system of claim 1, wherein a transmit power adjustment and CCA (Clear Channel Assessment) are used to reuse a spectrum when certain conditions are met.

10. The system of claim 1, wherein spatial reuse information is in a HE-SIG-A field in a physical layer (PITY) header.

11. A method of operating a wireless communications system comprising:
    determining an overlapping basic service set (OBSS) associated with one or more access points;
    reducing a transmit power of transceiver by a first margin at least based on the determined OBSS;
    increasing, in conjunction with the reduction of the transmit power, a packet detection threshold associated with the OBSS by a second margin for spatial reuse of the medium; and
    reducing transmit power for an uplink data frame to be sent to at least one of the one or more access points, wherein the transmit power for the uplink data frame is adjusted for at least one of the one or more access points to avoid interference with reception of an ongoing OBSS data unit to the transceiver.

12. The method of claim 11, further comprising configuring the system with a minimum receive sensitivity level.

13. The method of claim 11, wherein instructions increase a packet detection threshold when the packet is identified as being from another basic service set (BSS).

14. The method of claim 12, wherein the second margin is a receive power margin plus a predetermined power threshold.

15. The method of claim 14, wherein spatial reuse criteria are defined in one or more frames.

16. The method of claim 11, further comprising receiving the ongoing OBSS data unit.

17. The method of claim 11, further comprising transmitting the uplink data frame via one or more antennas.

18. The method of claim 11, further comprising applying a power reduction of a value plus a margin to a maximum operating power.

19. The method of claim 11, wherein spatial reuse information is in a HE-SIG-A field in a physical layer (PHY) header.

20. A non-transitory computer-readable information storage media, having stored thereon instructions, that when executed by a processor, perform a method for operating a wireless communications system, comprising:
    determining an overlapping basic service set (OBSS) associated with one or more access points;

reducing a transmit power of a transceiver by a first margin at least based on the determined OBSS;

increasing, in conjunction with the reduction of the transmit power, a packet detection threshold associated with the OBSS by a second margin for spatial reuse of the medium; and reducing transmit power for an uplink data frame to be sent to at least one of the one or more access points, wherein the transmit power for the uplink data frame is adjusted for at least one of the one or more access points to avoid interference with reception of an ongoing OBSS data unit to the transceiver.

* * * * *

UNITED STATES PATENT AND TRADEMARK OFFICE
CERTIFICATE OF CORRECTION

| | | |
|---|---|---|
| PATENT NO. | : 10,356,624 B2 | Page 1 of 1 |
| APPLICATION NO. | : 14/976351 | |
| DATED | : July 16, 2019 | |
| INVENTOR(S) | : Laurent Cariou et al. | |

It is certified that error appears in the above-identified patent and that said Letters Patent is hereby corrected as shown below:

In the Claims

• At Column 24, Claim 10, Line 23, delete "(PITY)" and insert -- (PHY) --, therefore.

• At Column 24, Claim 11, Line 29, after "power of" insert -- a --, therefore.

Signed and Sealed this
Twenty-second Day of October, 2019

Andrei Iancu
*Director of the United States Patent and Trademark Office*